W. A. SCHLEICHER.
DROP TERRET AND HOOK.
APPLICATION FILED AUG. 7, 1909.
973,980.
Patented Oct. 25, 1910.
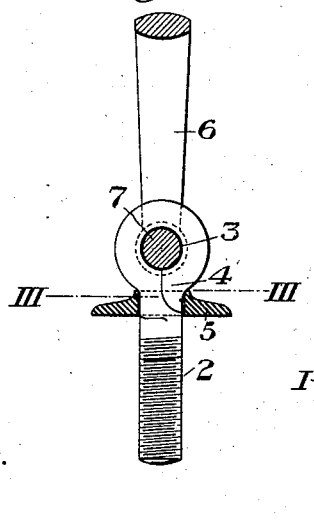
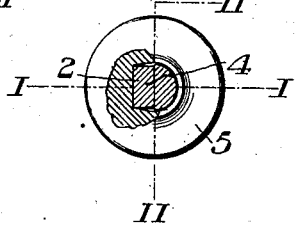
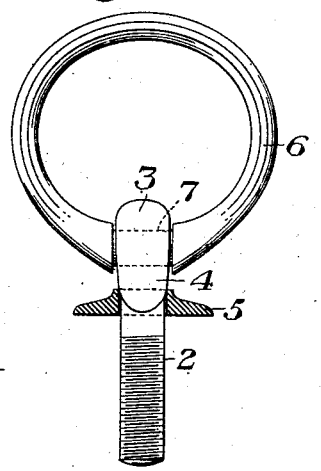
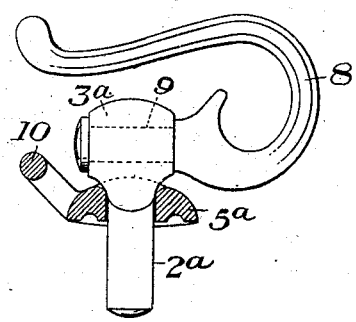
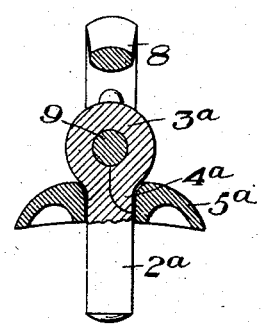
WITNESSES
INVENTOR

UNITED STATES PATENT OFFICE.

WILLIAM A. SCHLEICHER, OF CLEVELAND, OHIO.

DROP TERRET AND HOOK.

973,980.

Specification of Letters Patent.

Patented Oct. 25, 1910.

Application filed August 7, 1909. Serial No. 511,773.

*To all whom it may concern:*

Be it known that I, WILLIAM A. SCHLEICHER, of Cleveland, in the county of Cuyahoga and State of Ohio, have invented a new and useful Improvement in Drop Terrets and Hooks.

This invention relates to an improvement in drop terrets and hooks for harness, and is designed to provide a simple, cheap and efficient device of this character which can be readily manufactured and assembled.

Another object of my invention is to provide a terret and hook of this character with a screw shank which is held from turning in the washer, and in which the free end of the eye on the end of the shank is held from opening by means of the washer.

A further and more specific object is to provide a terret or hook of this character, in which the shank and ring or hook members can be separately formed, the shank member threaded as cheaply and readily as an ordinary bolt, and the parts then assembled and rigidly secured to each other.

The precise nature of my invention will be best understood by reference to the accompanying drawings, which will now be described, it being premised, however, that changes may be made in the details of construction and general arrangement of parts without departing from the spirit and scope of my invention as defined in the appended claim, of which the following is a full, clear and exact description; reference being had to the accompanying drawings, forming part of this specification, in which:—

Figure 1 is a sectional view of one form of my improved drop terret on the line I—I of Figs. 3; Fig. 2 is a similar view on the line II—II of Fig. 3; Fig. 3 is a sectional view on the line III—III of Fig. 1; and Figs. 4 and 5 are views similar to Figs. 1 and 2 respectively, showing my invention applied to a drop hook.

In the drawings, the numeral 2 designates the shank member, the lower portion of which is threaded to receive the usual nut for securing it to the saddle tree. The upper portion of the shank is provided with an eye 3, which is formed by a continuation of the shank bent upon itself and extending downwardly a short distance along the body portion of the shank, as indicated at 4. This portion 4 of the shank is rectangular in cross-section, as shown in Fig. 3. Surrounding this shank, immediately below the eye 3, is a washer 5, which is provided with an orifice one-half of which is of semi-circular form and the other half thereof is rectangular, or substantially the same in form as the cross-section of the downwardly extending portion 4 of the screw-shank.

6 is the ring of the terret, which is provided with a reduced portion 7, which is loosely engaged by the eye 3.

In Figs. 4 and 5 I have shown a hook for the check rein, such as are usually secured to the saddle tree between the terrets, and which is secured to a shank in a similar manner. In these figures, 8 designates the hook, having a reduced portion 9, which is engaged by an eye $3^a$ of a shank $2^a$, which are similar to the shank and eye shown in Figs. 1, 2 and 3. $5^a$ is the lock washer and formed integrally therewith is the loop 10, to which the crupper strap is secured.

All of the various parts are cast separately, and the eye of the shank cast open with sufficient space between the body portion and the portion 4, for the insertion of the reduced portion 7 of the ring 6, or for the reduced portion 9 of the hook 8. After the various parts have been finished, the ring or hook is inserted in the eye, after which the said eye is closed, as shown in Figs. 1 and 5. After the eye is closed, the lock washer is placed on the shank and when the terret or hook is secured in its proper position on the tree, the washer is held from rotation on the shank by means of the engagement of the portion 4 and the rectangular portion of the orifice in the washer. The engagement between the washer and the portion 4 also prevents the opening of the eye after the shank has been secured in place.

The advantages of my invention result from the provision of a device of this character in which the various parts can be separately cast and finished before assembling, which forms a simple and cheap construction, free from rivets.

I am aware of the fact that drop terrets and hooks are old; also that drop terrets and hooks provided with screw shanks are old, and do not broadly claim drop terrets and hooks of this character.

I claim:—

A harness mounting comprising a screw shank, a split eye on one end of the shank, a strap supporting member journaled in the eye and wholly supported thereby, said eye being formed of a continuation of the shank bent upon itself and extending along the shank, the free end of the eye extending below the journal of the strap supporting member and being rectangular in cross section for a portion of its length, and a washer engaging the shank and the rectangular free end of the eye and arranged to hold the free end in engagement with the shank and to prevent the rotation of the shank in the washer; substantially as described.

In testimony whereof, I have hereunto set my hand.

WILLIAM A. SCHLEICHER.

Witnesses:
 OSCAR J. FREY,
 JOHN McGRATH.